(12) United States Patent
Huang et al.

(10) Patent No.: US 7,624,267 B2
(45) Date of Patent: Nov. 24, 2009

(54) SIM-BASED AUTHENTICATION METHOD CAPABLE OF SUPPORTING INTER-AP FAST HANDOVER

(75) Inventors: Yu-Ren Huang, Banciao (TW); Jen-Shun Yang, Sinjhuang (TW); Chien-Chao Tseng, Hsinchu (TW); Jui-Tang Wang, Keelung (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 851 days.

(21) Appl. No.: 10/883,810

(22) Filed: Jul. 6, 2004

(65) Prior Publication Data
US 2005/0177723 A1  Aug. 11, 2005

(30) Foreign Application Priority Data
Feb. 10, 2004  (TW) .............................. 93103101 A (51) Int. Cl.
*H04L 9/32* (2006.01)
*H04L 29/06* (2006.01)
*H04L 29/00* (2006.01)

(52) U.S. Cl. .................. 713/168; 713/176; 713/155; 713/154; 455/410; 455/411; 455/436; 455/437; 455/442; 380/270; 380/229

(58) Field of Classification Search .................. None
See application file for complete search history.

(56) References Cited

U.S. PATENT DOCUMENTS

| 7,418,595 B2* | 8/2008 | Eronen et al. ............... 713/168 |
|---|---|---|
| 7,512,796 B2* | 3/2009 | Haverinen et al. ........... 713/168 |
| 7,565,135 B2* | 7/2009 | Patel ........................... 455/411 |
| 2004/0066769 A1* | 4/2004 | Ahmavaara et al. ......... 370/338 |
| 2005/0130659 A1* | 6/2005 | Grech et al. ................. 455/436 |
| 2005/0149734 A1* | 7/2005 | Eronen et al. ............... 713/176 |
| 2007/0060106 A1* | 3/2007 | Haverinen et al. .......... 455/410 |
| 2007/0154017 A1* | 7/2007 | Yun et al. .................... 380/270 |

OTHER PUBLICATIONS

Yu-Ren Huang; *Fast handover scheme for SIM-based authentication in WLAN/cellular integrated networks*; Jun. 2002; 61 pp.; Natioanl Chiao Tung University, Hsinchu, Taiwan, R.O.C.

Arunesh Mishra et. al.; *An Empirical Analysis of the IEEE 802.11 MAC Layer Handoff Process*; 8 pp.

(Continued)

*Primary Examiner*—Syed A. Zia
(74) *Attorney, Agent, or Firm*—Bacon & Thomas, PLLC (57) ABSTRACT

The invention relates to a SIM-based authentication method capable of supporting inter-AP fast handover, which can decrease the number of authentication procedures without negatively influencing the security of the wireless LAN by establishing an encrypted channel for each mobile node and using method 1: an aggressive key pre-distribution and method 2: probe request triggering passive key pre-query technique, thereby reducing the time of inter-AP handover for the mobile node. Furthermore, a re-authentication procedure is started to update the key after the key is used for a long time so as to ensure that the key is safe, thereby effectively achieving a fast and safe wireless LAN environment.

15 Claims, 7 Drawing Sheets

OTHER PUBLICATIONS

Nikita Borisov; *Security of the WEP algorithm*; University of California Berekeley; 4 pp.

H. Krawczyk et. al.; *HMAC; Keyed-Hashing for Message Authentication*; Feb. 1997; pp. 1-9.

L. Blunk et. al.; *PPP Extensible Authentication Protocol (EAP)*; Mar. 1998; The Internet Society; pp. 1-12.

C. Rigney et. al.; *Remote Authentication Dial In User Service (RADIUS)*; Jun. 2000; The Internet Society; pp. 1-57.

H. Haverinen (ed.) et. al.; *EAP SIM Authentication*; Internet Engineering Task Force; 65 pp.

Sangheon Pack et. al.; *Fast Inter-AP Handoff Using Predictive Authentication Scheme In A Public Wireless LAN*; 2002; School of Computer Science and Engineering, Seoul National University, Seoul Korea; pp. 1-12.

Sangheon Pack et. al.; *Pre-Authenticated Fast Handoff in a Public Wireless LAN Based on IEEE 802.1x Model[1]*; 2002; School of Computer Science and Engineering, Seoul National University, Seoul Korea; 8 pp.

Kaj J. Grahn et. al.; *Security of Mobile and Wireless Networks*; Jun. 2002; Informing Science; pp. 587-600.

William A. Arbaugh et. al.; *Your 802.11 Wireless Network has No Clothes\**; Mar. 30, 2001; Department of Computer Science, university of Maryland, College Park, Maryland; pp. 1-13.

Pat R. Calhoun et. al.; *Diameter Base Protocol*; Dec. 2002; The Internet Society; 165 pp.

*Draft Supplement to Standard for Telecommunications and Information Exchange Between Systems—LAN/MAN Specific Requirements—Part 11: Wireless Medium Access Control (MAC) and physical layer (PHY) specifications: Specification for Enhanced Security*; Nov. 2002; IEEE Std. 802.11i/D3.0; 211 pp.

*Digital cellular telecommunications system (Phase 2+); Security related network functions (GSM 03.20 version 5.1.1)*; Aug. 1997; European Telecommunication Standards Institute; France; 51 pp.

*Port-Based Network Access Control*; 2001; IEEE Std. 802.1x-2001; New York; 142 pp.

*Information technology-Telecommunications and information exchange between systems-Local and metropolitan area networks-Specific requirements-Part 11: Wireless LAN Medium Access Control (MAC) and Physical Layer (PHY) Specifications*; 1999; ANSI/IEEE Std. 802.11; 528 pp.

\* cited by examiner

SIM-BASED AUTHENTICATION METHOD CAPABLE OF SUPPORTING INTER-AP FAST HANDOVER

BACKGROUND OF THE INVENTION

1. Field of the Invention

The present invention relates to an authentication method for wireless local area networks (WLANs) and, more particularly, to an SIM-based authentication method capable of supporting inter-AP fast handover.

2. Description of Related Art

Figure 1:
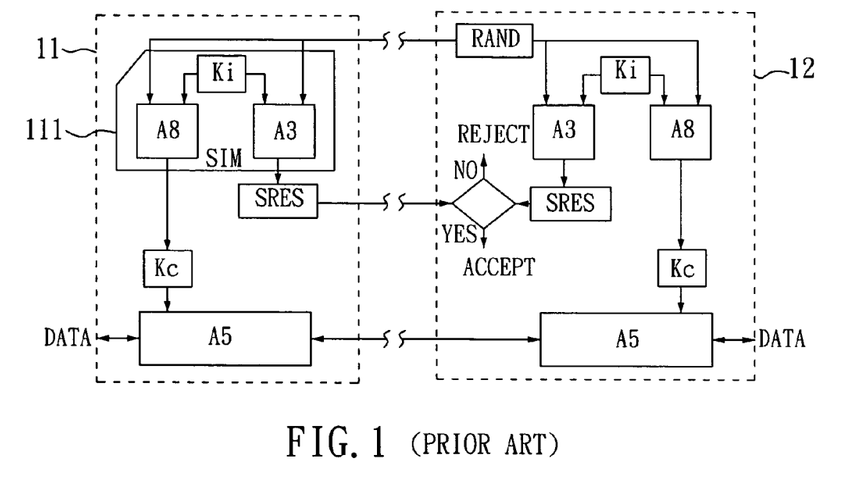
FIG. 1 is a block diagram of a typical SIM-based GSM/GPRS authentication and encryption mechanism.

For integrating a Public WLAN and a cellular network, the best first step is to integrate their authentication systems into a unique one. Current GSM/GPRS (Global System for Mobile Communication/General Packet Radio Service System) authentication systems are constructed essentially by using an SIM (Subscriber Identification Module) as a standard for user identification. FIG. 1 is a block diagram of a typical GSM/GPRS authentication and encryption mechanism. When sending an access request from a mobile station 11 with SIM card to a network 12, the network 12 randomly generates a random number RAND for the mobile station 11. The network 12 further generates a signature response SRES and an encrypted key Kc respectively by using the authentication algorithm A3 and the encrypted key generation algorithm A8 based on the random number RAND and a private key Ki. Similarly, the mobile station 11 sends the received random number RAND to the SIM card 111 in order to generate identical signature response SRES and encryption key Kc through the private key Ki and algorithms A3 and A8 in the SIM card 111. Next, the mobile phone 11 sends the identical signature response SRES back to the network 12. The network 12 compares the received identical signature response SRES with the signature response SRES generated by itself. When the comparison is matched, it results in authentication success. The mobile phone 11 and the network 12 use respective encryption key Kc and an encryption algorithm A5 to encrypt/decrypt transfer data.

The cited SIM-based authentication and encryption mechanism has an essential advantage that device portable is provided to transfer the authentication basis from the mobile phone to the SIM card, and thus GSM/GPRS users can conveniently change their mobile equipment at will. Current WLANs have been developing to use SIM as an authentication module. Accordingly, authentication basis will be unified in WLANs and cellular networks to thus complete security, unify the billing system and avoid inconvenience of user re-application, which can have significant help for B3G development.

Figure 2:
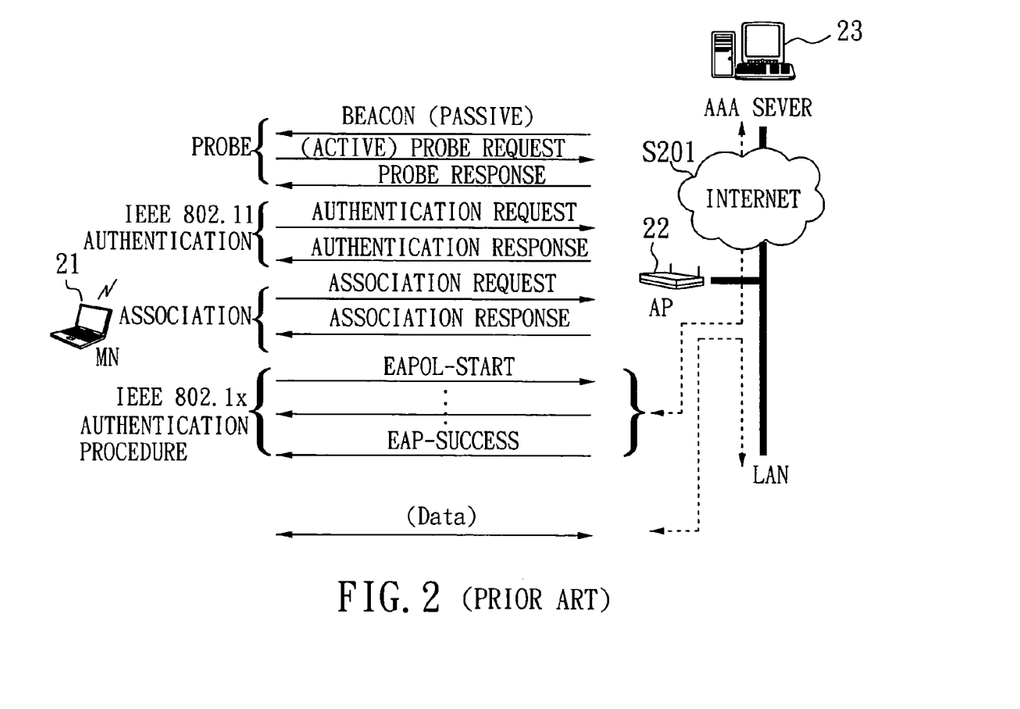
FIG. 2 is a graph of network access of a mobile node to an access point.

FIG. 2 is a flowchart of WLAN network access of a mobile node (MN) 21 to an access point (AP) 22. Upon the IEEE 802.11 standard, three steps of probe, authentication and association are necessary when a mobile node is associated with a WLAN, which cause a respective delay. Further, the authentication is based on Wired Equivalent Privacy (WEP) that has serious security problem. Therefore, after required IEEE 802.11 association is built, an authentication procedure for the IEEE 802.1x port-based access control (step S201) is typically used in current. As such, in FIG. 2, the authentication between the MN 21 and an AAA (Authentication, Authorization and Accounting) server 23 of the WLAN can be performed through the AP 22 to thus enhance the IEEE 802.11 authentication.

Figure 3:
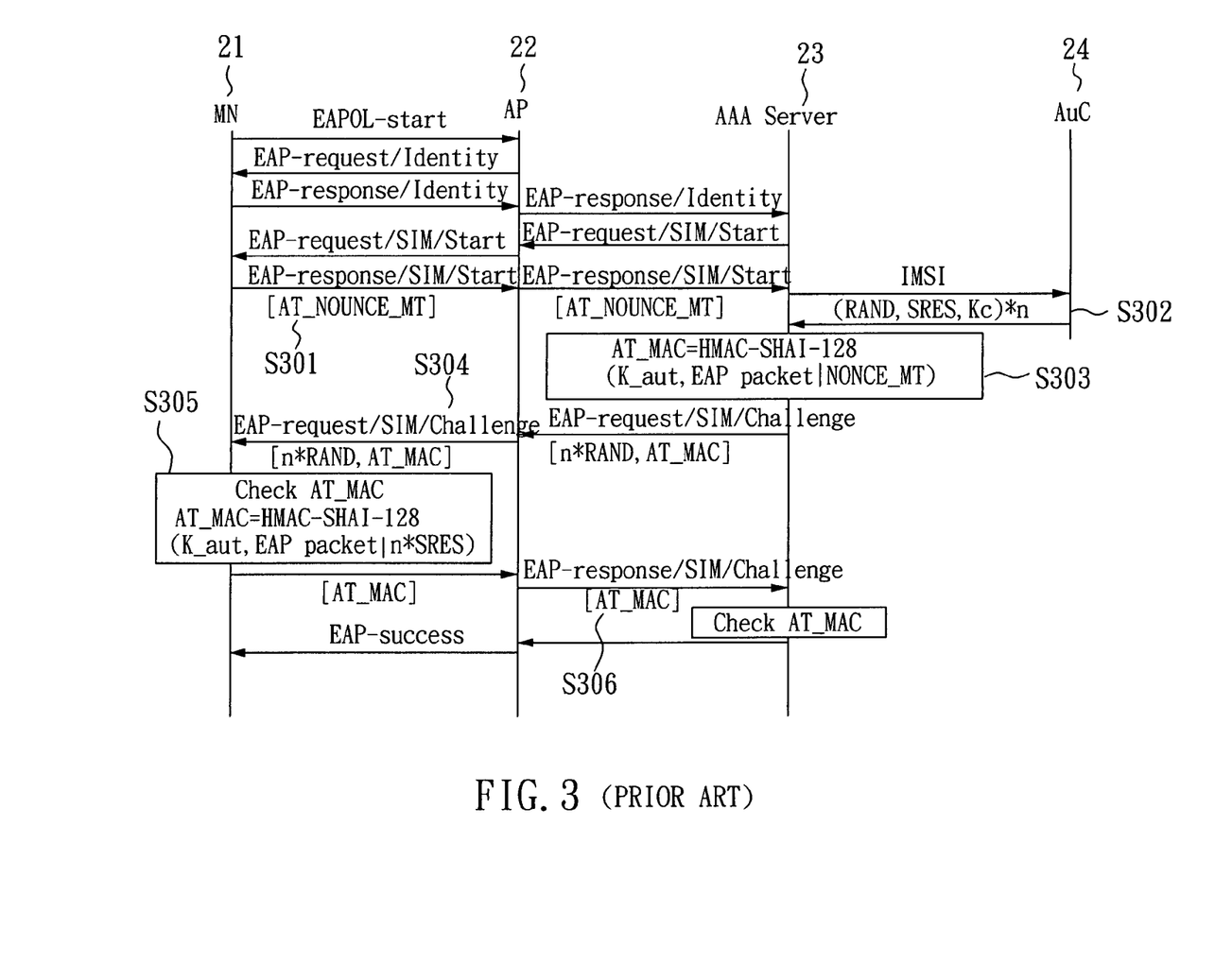
FIG. 3 is an authentication procedure for the IEEE 802.1x port-based access control according to current EAP-SIM draft.

FIG. 3 shows an authentication procedure for the IEEE 802.1x port-based access control according to current EAP (Extensible Authentication Protocol)-SIM draft. As shown in FIG. 3, the MN 21 generates a random number NONCE_MT to the AAA server 23 for challenging network validity (step S301). The AAA server 23 requests n sets of GSM/GPRS network authentication triplets (RAND, SRES, Kc) from an authentication center 24 (AuC) (step S302) and then computes an authentication key K_aut based on the NONCE_MT and n Kc given by AuC for further generating a response AT_MAC according to the K_aut and NONCE_MT (step S303) and sending the AT_MAC and n RAND back to the MN 21 (step S304). The MN 21 can verify AT_MAC to obtain network authentication and generate a response AT_MAC with n SRES respectively to the n sets of RAND (step S305). The AT_MAC with n SRES is sent to the AAA server (step S306) to verify the MN 21 oppositely.

In the cited authentication procedure, the MN 21 only challenges the AAA server 23 managed by a WLAN provider. However, the AuC 24 for providing the network authentication triplet is managed by a cellular network provider. Furthermore, the AuC 24 no longer participates in the authentication procedure after the AAA server 23 obtains the network authentication triplet. As such, the network authentication triplet may be illegally used to cause security defect.

In addition, in a large-scale WLAN system, the AAA server 23 for the network authentication is generally placed in a remote control room and thus delay time caused by the authentication is large. Further, more delay time may be caused by, for example, a MN handover re-authentication to the AAA server 23. Therefore, it is desirable to provide an improved authentication method to mitigate and/or obviate the aforementioned problems.

SUMMARY OF THE INVENTION

An object of the invention is to provide an SIM-based authentication method, which can effectively prevent a manipulated network device from stealing secret data of a user, thereby providing a safe WLAN environment.

Another object of the invention is to provide an SIM-based authentication method capable of supporting inter-AP fast handover in a WLAN, which can reduce unnecessary re-authentication procedure without affecting security, thereby effectively reducing time required by a mobile node for an inter-AP handover.

According to one aspect of the invention, an SIM-based authentication method is provided, which performs authentication on mobile nodes and networks in a wireless local area network (WLAN) environment such that packets between a legal mobile node and a legal network are transmitted through the WLAN. The mobile node has at least one SIM (Subscriber Identification Module) and the WLAN has at least one access point (AP) to service the mobile node and an authentication server, and is connected to a cellular network authentication center. The method includes a network authentication random number generating step, a network authentication signature response generating step, a mobile node pre-authentication random number generating step, a mobile node pre-authentication random number selecting step, a network authentication step, a mobile node authentication signature response generating step and a mobile node authentication step. In the network authentication random number generating step, the mobile node generates a network authentication random number for sending to the authentication center and computes a first signature response based on the network authentication random number. In the network authentication signature response generating step, the authentication center computes a second signature response based on the network authentication random number and sends the second signature response to the authentication server. In the mobile node pre-authentication random generating step, the authentication center generates one or more mobile node pre-authentication random numbers and corresponding signature responses for sending to the authentication sever. In the mobile node authentication random number selecting step, the authentication server selects one mobile node authentication random number and corresponding third signature response from the mobile node authentication random numbers and corresponding signature responses, and sends the mobile node pre-authentication random number and the second signature response to the mobile node. In the network authentication step, the mobile node authenticates the network by comparing the second signature response with the first signature response. In the mobile node authentication signature response generating step, the mobile node computes a fourth signature response based on the mobile node authentication random number, and sends the fourth signature response to the authentication server. In the mobile node authentication step, the authentication server authenticates the mobile node by comparing the fourth signature response with the third signature response.

According to another aspect of the invention, an SIM-based authentication method capable of supporting inter-AP fast handover in a WLAN is provided. The WLAN includes an authentication server and multiple access points managed by the authentication server. One of the access points services a mobile node. After the mobile node authentication and the network authentication are complete, a same temporal key is applied to message integrity check and encryption/decryption packets transmitted between the mobile node and its currently corresponding access point. The method includes an aggressive key pre-distribution step, a passive key pre-query/distribution step, a handover step and a check step. In the aggressive key pre-distribution step, the authentication server automatically distributes the temporal key to at least one access point around the access point currently servicing the mobile node. In the passive key pre-query/distribution step, the mobile node issues a WLAN standard probe message to trigger access points around the mobile node for performing key pre-query on the mobile node, which makes the authentication server passively distribute a temporal key for the mobile node to access points around the access point currently servicing the mobile node before the mobile node moves to a new access point. In the handover step, the mobile node moves to the new access point and is set as an authenticated mobile node. In a check step, the new access point checks its internal record to find the temporal key for the mobile node, thereby proceeding integrity protection and packet encryption/decryption.

Other objects, advantages, and novel features of the invention will become more apparent from the following detailed description when taken in conjunction with the accompanying drawings.

DETAILED DESCRIPTION OF THE PREFERRED EMBODIMENT

Figure 4:
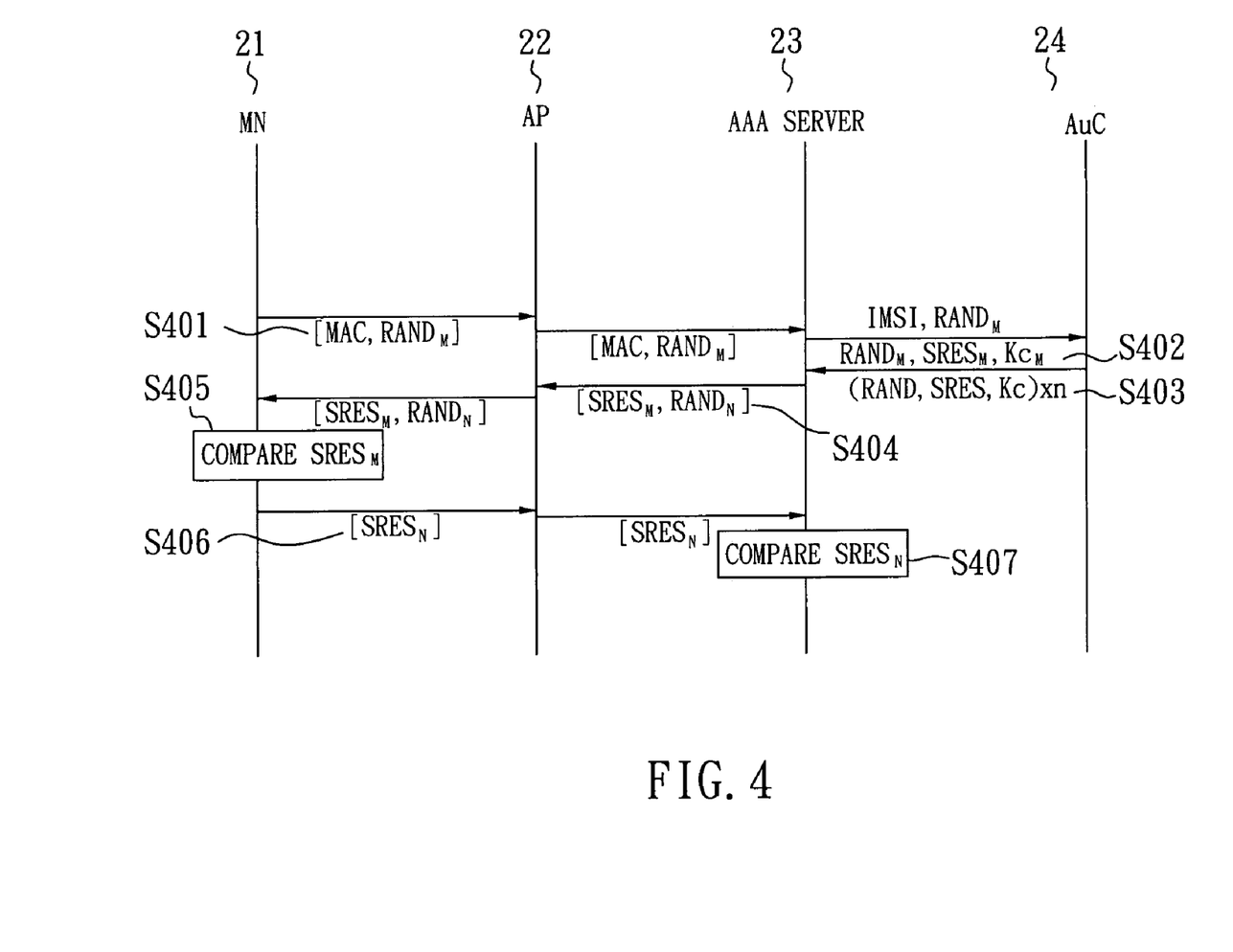
FIG. 4 is a message flowchart of an SIM-based authentication method according to the invention.

FIG. 4 is a message flowchart of an SIM-based authentication method according to the invention. As shown in FIG. 4, first, for authenticating the network side, a mobile node (MN) 21 generates a random number $RAND_M$. Next, the random number $RAND_M$ and a MAC address of the MN 21 are sent to an authentication center (AuC) 24 of a cellular network through the access point (AP) 22 and an AAA (Authentication, Authorization and Accounting) server 23 (step S401). The MN 21 further uses an authentication algorithm A3 and an encryption key generation algorithm A8 to compute a signature response $SRES_M$ and an encrypted key $Kc_M$ respectively corresponding to the random number $RAND_M$. At the network side, when the AuC 24 receives the random number $RAND_M$, it accordingly generates a network authentication triplet ($RAND_M$, $SRES_M$, $Kc_M$), wherein the AuC 24 also uses the authentication algorithm A3 and the encryption key generation algorithm A8 to compute the signature response $SRES_M$ and the encryption key $Kc_M$ respectively corresponding to the random number $RAND_M$. The AuC 24 then sends the triplet ($RAND_M$, $SRES_M$, $Kc_M$) to the AAA server 23 (step S402). In addition, the AuC 24 also generates n mobile node authentication triplets (RAND,SRES,Kc)×n and sends them to the AAA server 23 (step S403). Accordingly, the AAA server 23 can select one mobile node authentication triplet ($RAND_N$,$SRES_N$,$Kc_N$) for authenticating the MN 21. The AAA server 23 sends both the random number $RAND_N$ of the mobile node authentication triplet selected and the signature response $SRES_M$ of the network authentication triplet back to the MN 21 through AP22 (step S404). Accordingly, the MN 21 can compare the response $SRES_M$ received with its own one (step S405) and thus complete network authentication if they are matched.

In addition, after the random number $RAND_N$ is received, the MN 21 can use the authentication algorithm A3 and the encryption key generation algorithm A8 to compute the signature response $SRES_N$ and the encryption key $Kc_N$ respectively corresponding to the random number $RAND_N$. Next, the MN 21 sends the signature response $SRES_N$ to the AAA server 23 through the access point (AP) 22 (step S406). Next, the AAA server 23 compares the signature response $SRES_N$ sent by the MN 21 with its own one (step S407) and thus complete mobile node authentication if they are matched. As such, safe full authentication (mutual authentication) is achieved by sending the signature responses $RAND_M$ and $RAND_N$ to and from. Concurrently, the encryption keys $Kc_M$ and $Kc_N$ are completely exchanged so that the MN 21 and the AAA server 23 have the same encryption keys $Kc_M$ and $Kc_N$ respectively.

In the aforementioned authentication, since the random number $RAND_M$ is selected by the MN 21 in random, an illegal network user cannot compute the signature response $SRES_M$ and encryption key $Kc_M$ corresponding to the random number $RAND_M$ because it lacks of the network authentication triplet ($RAND_M$, $SRES_M$, $Kc_M$) for successive authentication and encryption. Further, the cellular network provider who manages the AuC 24 can have strong force of constraint on the WLAN provider who manages the AAA server 23 by means of $RAND_M$.

Figure 5:
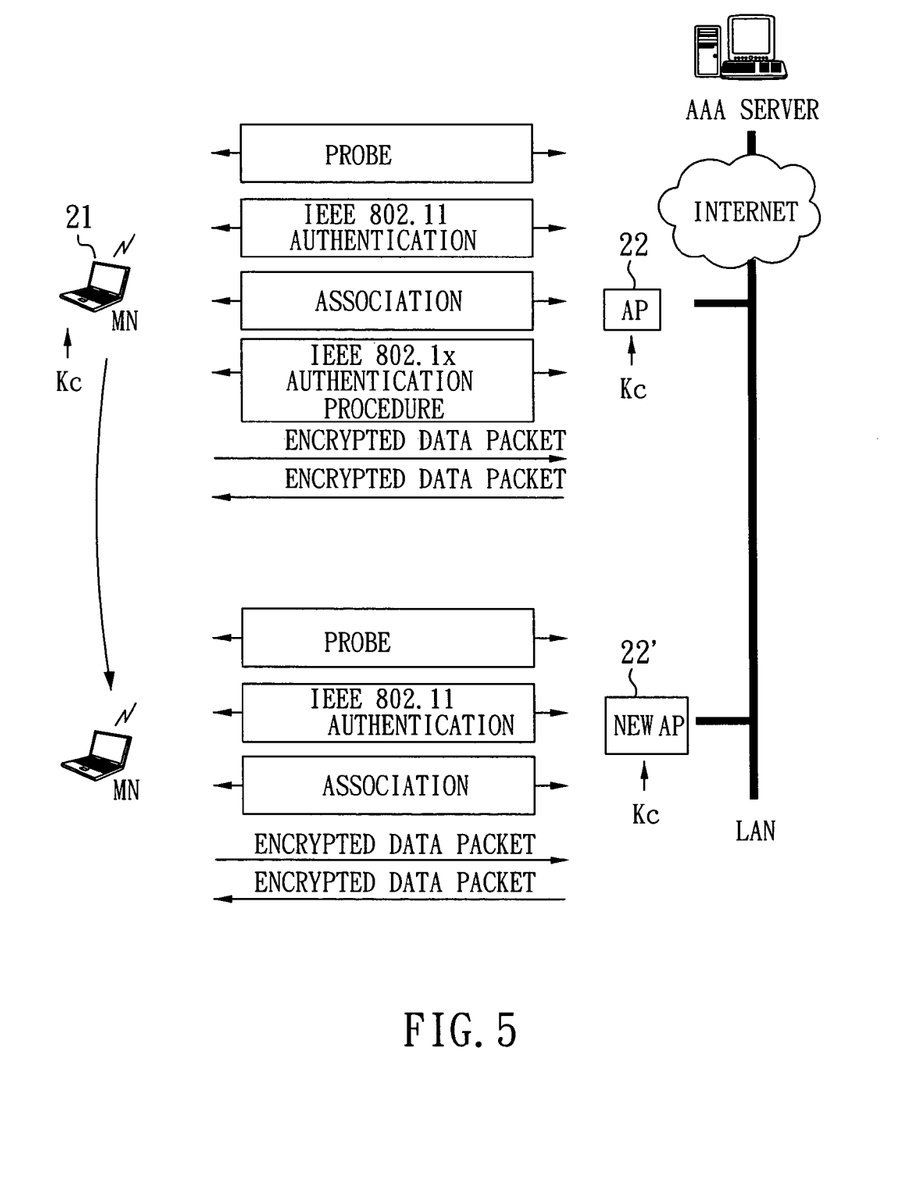
FIG. 5 is a flowchart of applying encryption key to encrypt/decrypt packets between a WLAN and a mobile node after required authentication for the mobile node is complete and the mobile node moves to a new access point according to the invention.

After the authentication is complete, as shown in FIG. 5, an encryption key is applied to message integrity check and encryption/decryption packets transmitted between the network and the mobile node, wherein the encryption key can be $Kc_M$, $Kc_N$ or a combination thereof. In this embodiment, the encryption keys $Kc_M$ and $Kc_N$ are concatenated as a temporal key Kc. Further, data packet encryption and integrity is protected based on this temporal key by Temporal Key Integrity Protocol (TKIP), Advances Encryption Standard (AES) or any other security algorithm, thus packets can be transmitted safely between the network and the mobile node.

Therefore, the temporal key Kc ($Kc_M$ plus $Kc_N$) for packet integrity protection and encryption/decryption can effectively prevent messages from illegally cracking or stealing by an unauthorized person. When the MN 21 moves to an AP 22', as shown in FIG. 5, if the new AP 22' has or obtains a temporal key Kc originally used by the MN 21 and the AP 22, the temporal key Kc can be directly applied to packet encryption/decryption between the MN 21 and the AP 22' (after three steps of probe, IEEE 802.11 authentication and association), without 802.1x re-authentication, i.e., the MN 21 does not require re-authentication for the movement.

The invention applies key pre-distribution technique to the AP 22' for obtaining the temporal key Kc as soon as possible before the MN 21 moves to the AP 22'. The key pre-distribution technique can have strategies and methods roughly divided into key flooding and select distribution. The key flooding is that the AAA server 23 pre-distributes required temporal key Kc to all APs. The select distribution is that the AAA server 23 only pre-distributes required temporal key Kc to one or plural APs around the AP 22 where the MN 21 is currently located on.

Figure 6:
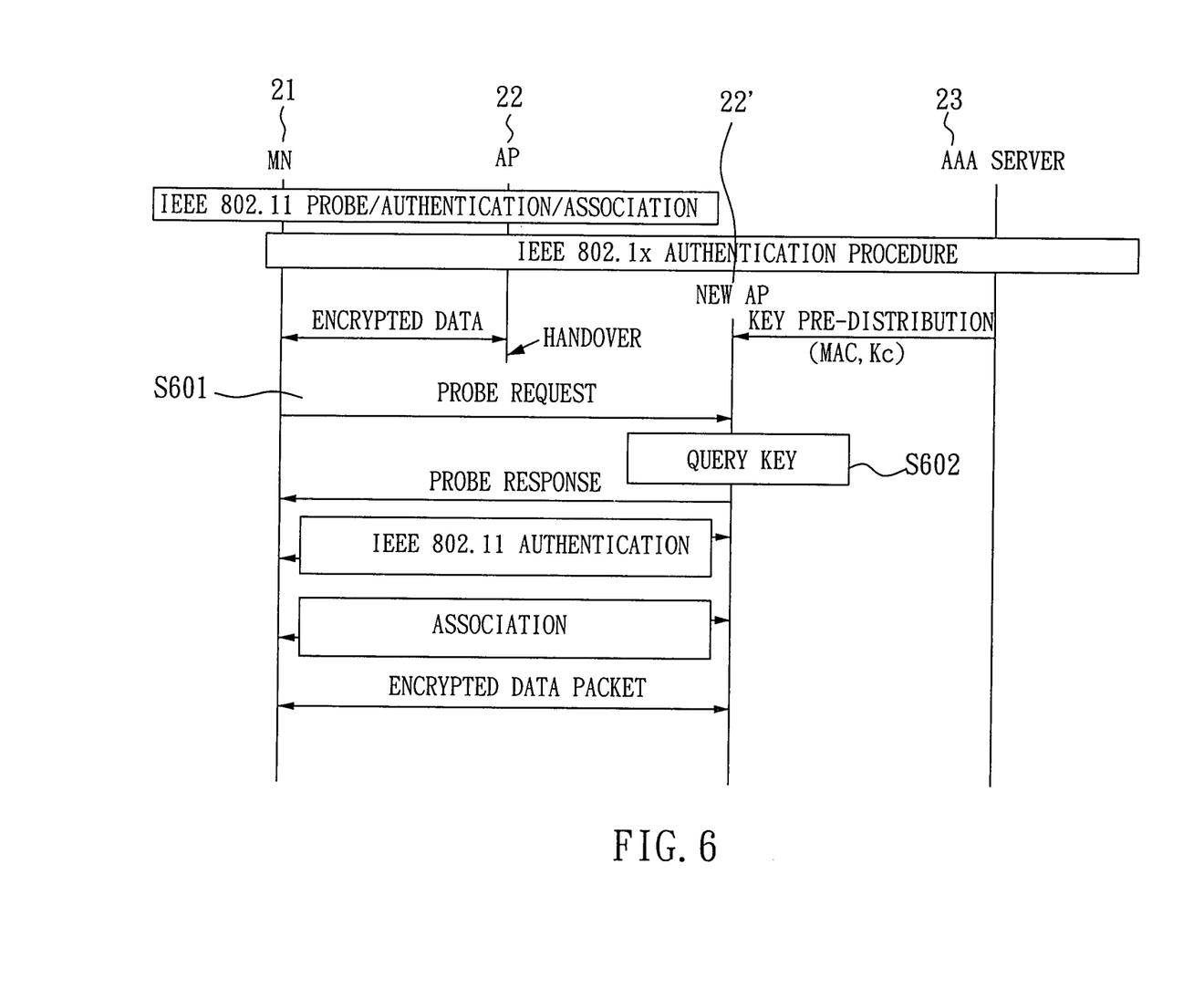
FIG. 6 is a message flowchart of handover occurrence in an authenticated mobile node moving from an old access point to a new access point and this new access point has the corresponding temporal key for this mobile node.

FIG. 6 is a message flowchart of handover occurrence in a mobile node moving from an old access point to a new access point with a temporal key. As shown in FIG. 6, when changing to the new AP 22', the MN 21 sends an traditional 802.11 probe request with the privacy bit set to inform the new AP 22', which is to be an authenticated MN 21 (step S601). For example, the MN 21 sets a privacy bit (WEP bit) in the probe request such that when the new AP 22' finds the privacy bit set (which represents that a verified MN is processing the probe), it further look up the internal record (step S602) to find the temporal key Kc for the MN 21 to perform packet encryption/decryption and authentication. Next, after the temporal key Kc is found, the subsequent IEEE802.11 standard authentication and association between the MN 21 and the new AP 22' is complete under a secured environment protected by temporal key. After 802.11 association finished, MN 21 can access AP 22' without 802.1x re-authentication.

Figure 7:
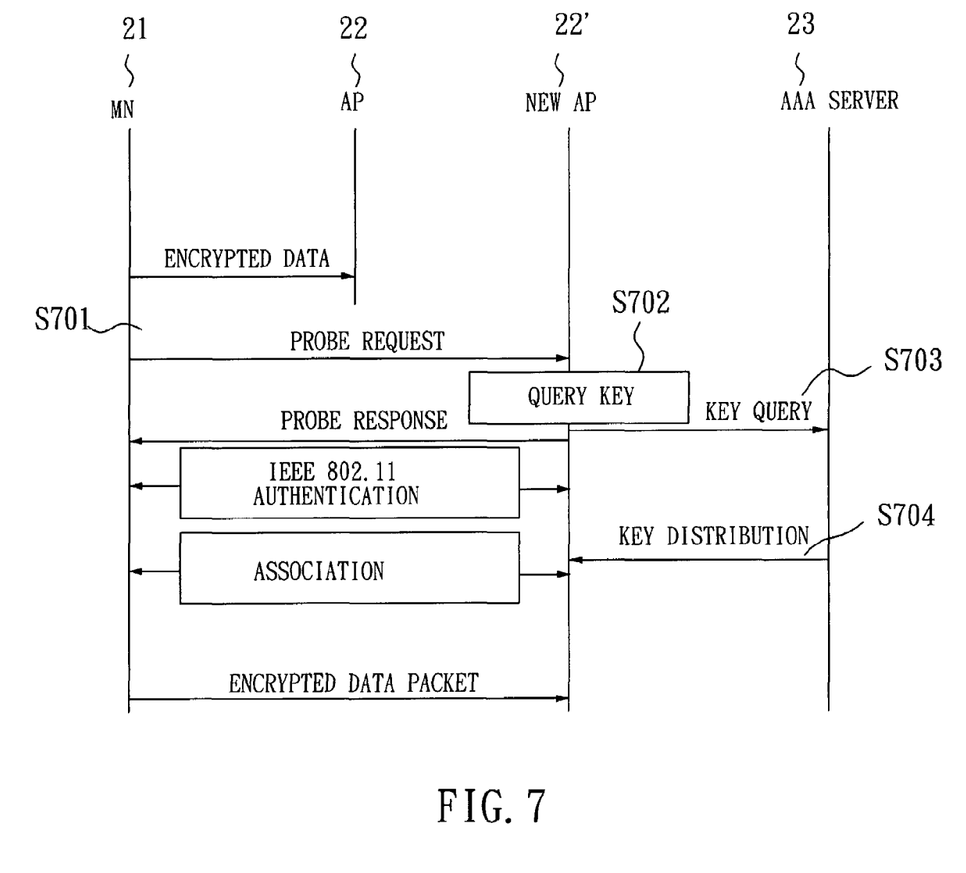
FIG. 7 is a message flowchart of handover occurrence in a authenticated mobile node moving from an old access point to a new access point and this new access point does not have the corresponding temporal key for this mobile node.

If the new AP 22' cannot find the temporal key Kc from the internal record, it has to ask the AAA server 23 the key Kc. FIG. 7 is a message flowchart of handover occurrence in a mobile node moving from an old access point to a new access point without the temporal key. As shown in FIG. 7, when changing to the new AP 22', the MN 21 informs the new AP 22' its authentication in the probe step (step S701). The new AP 22' checks the internal record (step S702) but cannot find the temporal key Kc for the MN 21. Next, the new AP 22' sends a key query message to the AAA server 23 to ask for the temporal key Kc (step S703). For protecting the (re)association under secured environment, the AP22' will hold association procedure until the AAA server to send corresponding temporal key for MN21. After 802.11 association finished, MN 21 can access AP 22' without 802.1x re-authentication. If the AAA server 23 does not have the temporal key Kc, the new AP 22' has to activate a full authentication procedure.

Figure 8:
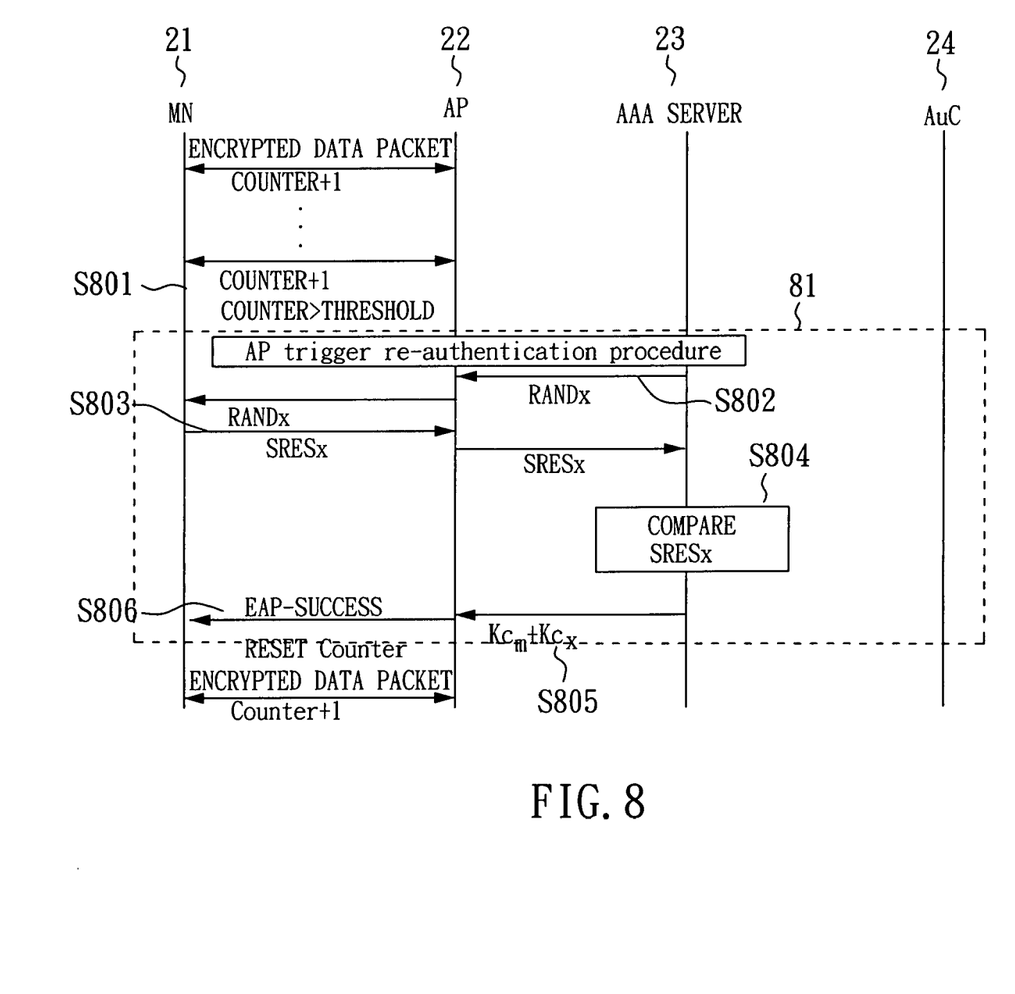
FIG. 8 is a re-authentication procedure to activate when using a temporal key for a long time.

To further prevent the temporal key found by guessing in a long-term use and thus increase key security, FIG. 8 shows a re-authentication procedure to activate when using a temporal key for a long time. As shown in FIG. 8, a counter records packet transfer number between the MN 21 and the AP 22 to thus indicate used number of the temporal key. The counter is not reset for handover. When a count of the counter exceeds a predetermined threshold (step 801), the AAA server 23 activates a re-authentication procedure 81 which is executed on the background without pausing the original data transfer between MN and AP22. In the procedure 81, the AAA server 23 selects another mobile node authentication triplet ($RAND_X$, $SRES_X$, $Kc_X$) not used from the n triplets (RAND, SRES, Kc)×n given by the AuC 24 in the previous authentication. The AAA server 23 sends random number $RAND_X$ of the triplet to the MN 21 through the AP 22 (step S802). After the random number $RAND_X$ is received, the MN 21 can use the authentication algorithm A3 and the encryption key generation algorithm A8 to compute the signature response $SRES_X$ and the encrypted key $KC_X$ respectively corresponding to the random number $RAND_X$. Next, the MN 21 sends the signature response $SRES_X$ to the AAA server 23 (step S803). Accordingly, the AAA server 23 can compare the signature response $SRES_X$ received with its own one (step S804) and thus complete re-authentication to the MN 21 if they are matched. Next, the encryption key $Kc_N$ is updated by $Kc_X$. Concurrently, the encryption keys $Kc_M$ and $Kc_X$ are distributed to the AP 22 currently located by the MN 21 and access points around the AP 22 (step 805). As such, the MN 21, the AP 22 and the AAA server 23 have the same encryption keys $Kc_M$ and $Kc_X$ respectively. When the MN 21 receives a message of EAP-Success (step S806), it activates the new temporal key Kc by sending a message packet with a counter reset to inform the AP 22 about applying the new encryption key $Kc_X$ to integrity protection and encryption/decryption operation. However, before the counter is reset, the MN 21 and the AP 22 still apply the old encrypted key $KC_N$ to integrity protection and encryption/decryption operation for making sure that data messages between the MN 21 and the AP 22 are continuously processed before the re-authentication is complete.

To synchronize the temporal key activation time, an unencrypted counter is required. The cited TKIP Sequence Counter (TSC) is naturally applied to use as this counter.

As cited, only one key is changed in the re-authentication procedure 81, but the encryption/decryption and authentication cannot be complete properly if any key is missing in authentication. In addition, only a single authentication from the network to the MN 21 is processed in the re-authentication procedure 81, but only legal AP 22 can have the two keys so that an unauthorized person cannot obtain the $Kc_M$ and thus leads to failure. In view of the foregoing, it is known that the invention can effectively prevent use's secret data from stealing by a manipulated network device. In addition, building a specific encryption channel for each MN and performing the key pre-query technique through the aggressive key pre-distribution and probe message triggering access point can reduce unnecessary re-authentication procedures without affecting security and further reduce time required by the MN for inter-AP handover. To further protect key security, the invention uses periodic updated re-authentication procedure at non-handover to periodically update the key for a mobile node, thereby ensuring appropriate total key-used number and effectively obtaining desired fast and safe WLAN environment.

Although the present invention has been explained in relation to its preferred embodiment, it is to be understood that many other possible modifications and variations can be made without departing from the spirit and scope of the invention as hereinafter claimed.

What is claimed is:

1. An SIM-based authentication method, which performs authentication on mobile nodes and networks in a wireless local area network (WLAN) environment such that packets between a legal mobile node and a legal network are transmitted through the WLAN, the mobile node having at least one SIM and the WLAN having at least one access point (AP) to service the mobile node, an authentication server and a connected authentication center, the method comprising the steps:

a network authentication random number generating step, in which the mobile node generates a network authentication random number for sending to the authentication center and computes a first signature response and a network authentication encryption key based on the network authentication random number;

a network authentication signature response generating step, in which the authentication center computes a second signature response and a same network authentication encryption key based on the network authentication random number and sends the second signature response to the authentication server;

a mobile node pre-authentication random number generating step, in which the authentication center generates one or more mobile node pre-authentication random numbers and corresponding signature responses for sending to the authentication sever and also generates a mobile node authentication encryption key corresponding to the mobile node authentication random number;

a mobile node authentication random number selecting step, in which the authentication server selects one mobile node authentication random number and corresponding third signature response from the mobile node pre-authentication random numbers and corresponding signature responses, and sends the mobile node authentication random number and the second signature response to the mobile node;

a network authentication step, in which the mobile node authenticates the network by comparing the second signature response with the first signature response;

a mobile node authentication signature response generating step, in which the mobile node computes a fourth signature response and a same mobile node authentication encryption key based on the mobile node authentication random number, and sends the fourth signature response to the authentication server; and a mobile node authentication step, in which the authentication server authenticates the mobile node by comparing the fourth signature response with the third signature response.

2. The method as claimed in claim 1, wherein in the network authentication random number generating step, according to the SIM, the mobile node uses an authentication algorithm (A3), and an encryption key generation algorithm respectively to compute the first signature response and the network authentication encryption key.

3. The method as claimed in claim 2, wherein in the network authentication signature response generating step, the authentication center uses the authentication algorithm and the encrypted key generation algorithm respectively to compute the second signature response and the network authentication encryption key.

4. The method as claimed in claim 1, wherein in the mobile node authentication signature response generating step, according to the SIM, the mobile node uses an authentication algorithm and an encrypted key generation algorithm respectively to compute the fourth signature response and the mobile node authentication encryption key.

5. The method as claimed in claim 1, further comprising: a data packet transmitting step, in which the mobile node and the network use a combination of the network and the mobile node authentication encryption keys as a temporal key to encrypt, decrypt and integrity check packets transmitted between the mobile node and the network.

6. The method as claimed in claim 5, wherein the temporal key is the network authentication encryption key, the mobile node authentication encryption key, a concatenation of the network and the mobile node authentication encryption keys, or an output of key generation function by inputting the network authentication encryption key and the mobile node authentication encryption key.

7. The method as claimed in claim 5, further comprising:
a key pre-distribution step, in which the authentication server distributes the temporal key to at least one AP around the AP currently servicing the mobile node.

8. The method as claimed in claim 7, further comprising:
a handover step, in which the mobile node moves to a new AP and is set as a authenticated mobile node; and
a check step, in which the new AP checks its internal record for finding the temporal key for the mobile node, thereby proceeding message integrity operation and packet encryption/decryption.

9. The method as claimed in claim 8, wherein if the check step cannot find the temporal key, the new AP asks the authentication server for the temporal key used by the mobile node.

10. The method as claimed in claim 5, further comprising:
a re-authentication step, in which an NP starts a re-authentication procedure when packet transfer number between the mobile node and the AP exceeds a predetermined threshold.

11. The method as claimed in claim 10, wherein the re-authentication step comprises:
a mobile node authentication random number re-selecting step, in which the authentication server selects a unused mobile node authentication random number in the mobile node authentication random selecting step and sends the unused random number corresponding to a fifth signature response to the mobile node;
a mobile node authentication signature response re-generating step, in which the mobile node computes a sixth signature response based on the unused random number and
sends the sixth signature response to the authentication server; and
a mobile node re-authentication step, in which the authentication server compares the fifth and the sixth signature responses to authenticate the mobile node.

12. The method as claimed in claim 11, wherein in the mobile node authentication random number re-selecting step, the mobile node authentication random number corresponds to a mobile node authentication encryption key; according to the mobile node authentication random number, the mobile node computes a same mobile node authentication encryption key in the mobile node authentication signature response re-generating step.

13. An SIM-based authentication method capable of supporting inter-AP fast handover in a WLAN, the WLAN including an authentication server and multiple access points managed by the authentication server, one of the access points servicing a mobile node, applying a same temporal key to message integrity check and encryption/decryption packets transmitted between the mobile node and its currently corresponding access point after mobile node authentication and network authentication are complete, the method comprising the steps:

an aggressive key pre-distribution step, in which the authentication server automatically distributes the temporal key to at least one access point around the access point currently servicing the mobile node;

a passive key pre-query/distribution step, in which the mobile node issues a WLAN standard probe message with a privacy bit set to trigger access points around the mobile node for performing key pre-query on the mobile node, which makes the authentication server passively distribute a temporal key for the mobile node to access points around the access point currently servicing the mobile node before the mobile node moves to a new access point, wherein the temporal key is a selection from the network authentication encryption key, the mobile node authentication encryption key, a concatenation of the network and the mobile node authentication encryption keys, and an output of key generation function by inputting the network authentication encryption key and the mobile node authentication encryption key;

a handover step, in which the mobile node moves to the new access point and is set as an authenticated mobile node; and a check step, in which the new access point checks its internal record to find the temporal key for the mobile node, thereby proceeding integrity protection and packet encryption/decryption.

14. The method as claimed in claim 13, wherein if the check step cannot find the temporal key, the new access point asks the authentication server for the temporal key used by the mobile node.

15. The method as claimed in claim 14, wherein if the new access point cannot obtain the temporal key from the authentication server, the new access point starts an authentication procedure.

* * * * *

UNITED STATES PATENT AND TRADEMARK OFFICE
CERTIFICATE OF CORRECTION

PATENT NO. : 7,624,267 B2  Page 1 of 1
APPLICATION NO. : 10/883810
DATED : November 24, 2009
INVENTOR(S) : Huang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1450 days.

Signed and Sealed this

Fourteenth Day of December, 2010

David J. Kappos
*Director of the United States Patent and Trademark Office*